United States Patent
Song et al.

(10) Patent No.: US 11,611,114 B2
(45) Date of Patent: Mar. 21, 2023

(54) SYSTEM AND METHOD FOR DETECTING BATTERY CELL SWELLING

(71) Applicant: LG CHEM, LTD., Seoul (KR)

(72) Inventors: Yee Gahng Song, Daejeon (KR); Seung Min Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 290 days.

(21) Appl. No.: 16/763,504

(22) PCT Filed: Jan. 22, 2019

(86) PCT No.: PCT/KR2019/000922
§ 371 (c)(1),
(2) Date: May 12, 2020

(87) PCT Pub. No.: WO2019/146999
PCT Pub. Date: Aug. 1, 2019

(65) Prior Publication Data
US 2020/0343600 A1    Oct. 29, 2020

(30) Foreign Application Priority Data
Jan. 24, 2018 (KR) .................. 10-2018-0008898

(51) Int. Cl.
*H01M 10/48* (2006.01)
*H01M 10/63* (2014.01)
*H01M 10/6563* (2014.01)

(52) U.S. Cl.
CPC ......... *H01M 10/486* (2013.01); *H01M 10/63* (2015.04); *H01M 10/6563* (2015.04)

(58) Field of Classification Search
CPC .................................................. H01M 10/486
See application file for complete search history.

(56) References Cited

U.S. PATENT DOCUMENTS

| 9,806,310 B1 | 10/2017 | Pounds |
| 2012/0032638 A1 | 2/2012 | Jung |
| 2012/0156530 A1 | 6/2012 | Kang et al. |
| 2012/0256569 A1* | 10/2012 | Kawahara ............. H01M 10/63 374/142 |
| 2013/0257382 A1 | 10/2013 | Field et al. |
| 2015/0084600 A1 | 3/2015 | Sengupta et al. |
| 2015/0311572 A1 | 10/2015 | Sung et al. |
| 2016/0322676 A1 | 11/2016 | Jun et al. |

(Continued)

FOREIGN PATENT DOCUMENTS

| JP | 2012-110129 A | 6/2012 |
| JP | 2012-225844 A | 11/2012 |

(Continued)

OTHER PUBLICATIONS

International Search Report for PCT/KR2019/000922 (PCT/ISA/210) dated Apr. 30, 2019.

(Continued)

*Primary Examiner* — Brian R Ohara
(74) *Attorney, Agent, or Firm* — Birch, Stewart, Kolasch & Birch, LLP

(57) ABSTRACT

A system and method for detecting swelling of a battery cell using a temperature sensor pre-mounted on a battery module without a separate additional device.

6 Claims, 4 Drawing Sheets

(56) References Cited

U.S. PATENT DOCUMENTS

2017/0365893 A1 12/2017 Kim et al.
2018/0006342 A1 1/2018 Lee et al.

FOREIGN PATENT DOCUMENTS

| JP | 2015-56354 A | 3/2015 |
| KR | 10-2005-0070726 A | 7/2005 |
| KR | 10-1000550 B1 | 12/2010 |
| KR | 10-2011-0058378 A | 6/2011 |
| KR | 10-2012-0067520 A | 6/2012 |
| KR | 10-1340365 B1 | 12/2013 |
| KR | 10-2016-0014167 A | 2/2016 |
| KR | 10-2016-0129626 A | 11/2016 |
| KR | 10-2016-0145428 A | 12/2016 |

OTHER PUBLICATIONS

Extended European Search Report for European Patent Application No. 19744446.6 dated Nov. 2, 2020.

\* cited by examiner

[FIG. 1]
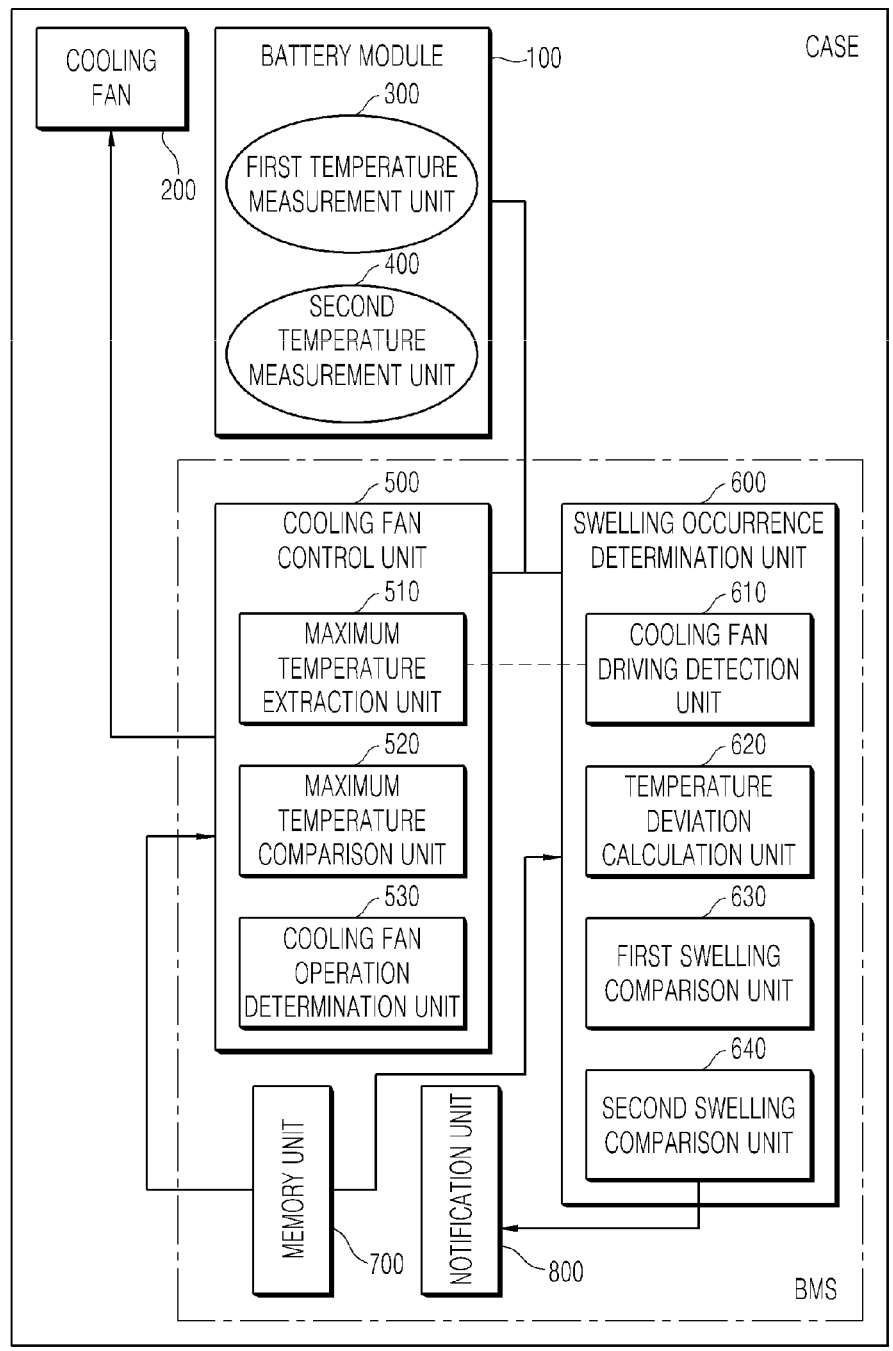

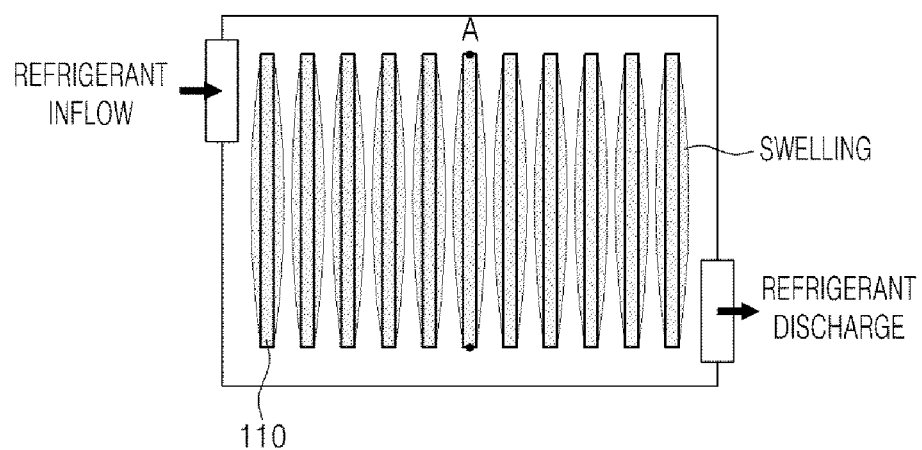
[FIG. 2]

[FIG. 3]
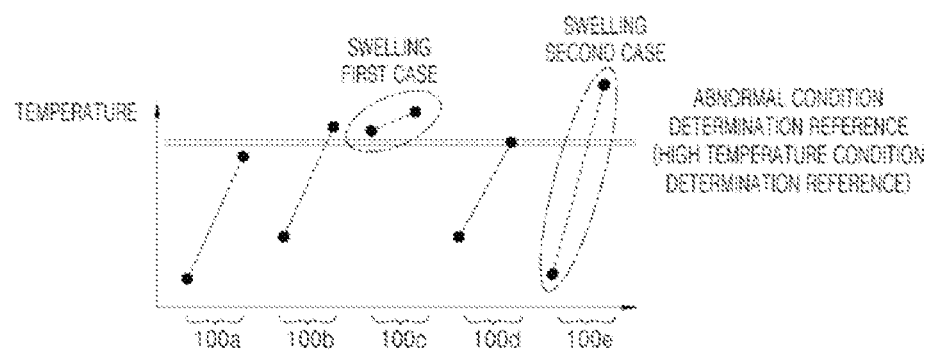

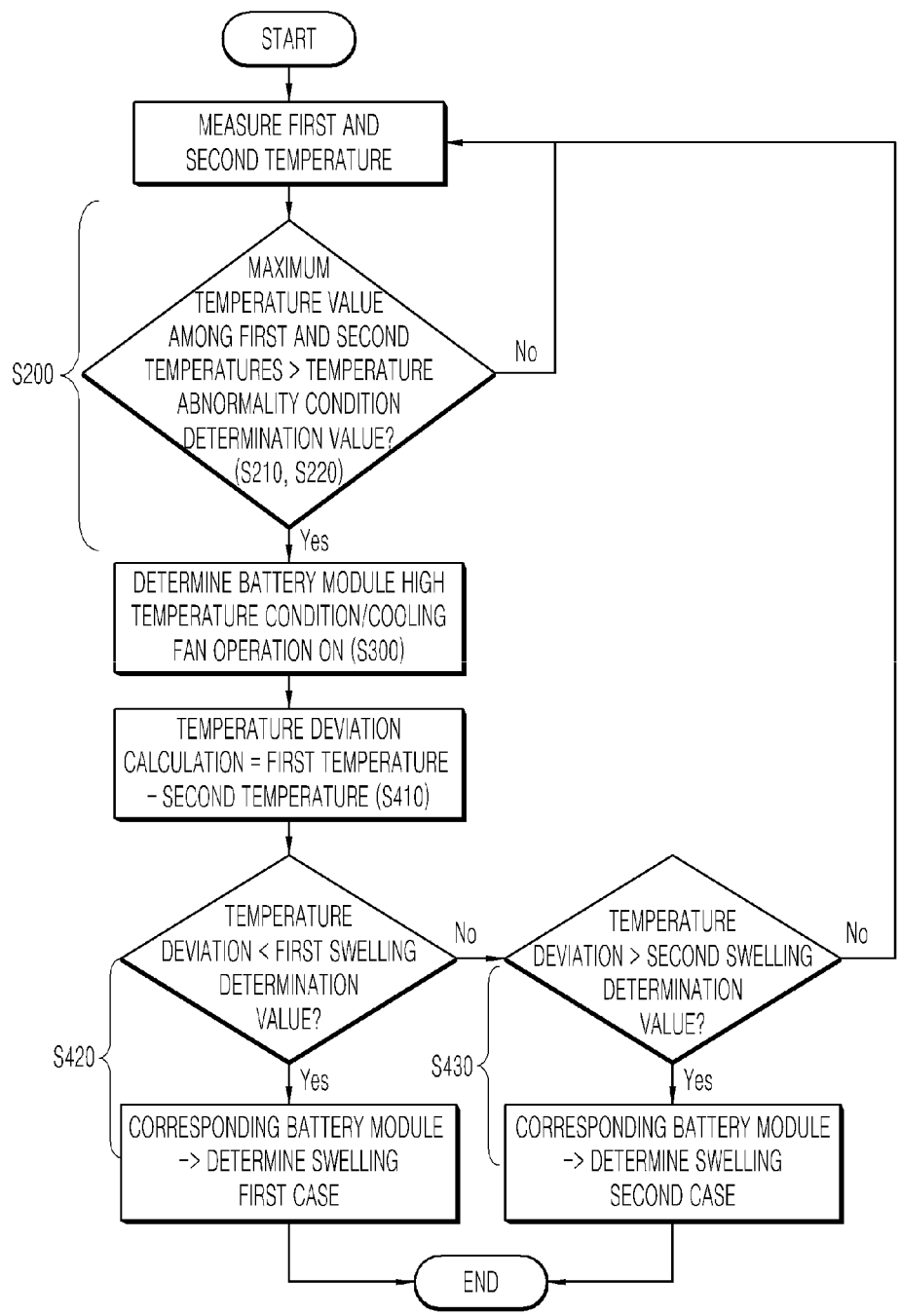
[FIG. 4]

SYSTEM AND METHOD FOR DETECTING BATTERY CELL SWELLING

TECHNICAL FIELD

The present invention relates to a system and method for detecting swelling of a battery cell, and more particularly, to a system and method for detecting swelling of a battery cell using a temperature sensor pre-mounted on a battery module without a separate additional device.

BACKGROUND ART

Recently, as technology development and demand for handheld devices such as portable computers, mobile phones, and cameras have increased, demand for batteries as an energy source is rapidly increasing, and many studies on lithium ion batteries showing high energy density and operating potential and having long cycle life and low self-discharge rate among such batteries have been continuously carried out, and they have been widely used in commercial applications. Especially, the pouch type battery is easy to change various types of structures according to customer's needs, so that the product application is excellent, and the battery has an advantage of producing a small quantity of various kinds of products compared to batteries that use metal can-shaped battery cases. However, due to the lithium ion active material of the pouch type lithium ion battery, swelling phenomenon, in which a battery swells due to the degree of degradation, inevitably occurs when the use time passes.

The battery may reach a specific degradation condition earlier than the design life due to a different operating method and environment from the initial design. Due to this, if the battery that caused the swelling phenomenon is used continuously, it may affect battery life and stability. Therefore, when a swelling phenomenon occurs, sensing and detecting this quickly may be used to maintain battery system performance, prevent damage, and prevent other accidents.

In relation to conventional techniques for sensing/detecting the swelling of the battery for this, additional sensors (e.g., pressure sensors) may be installed in the battery module to detect if the battery module is swelling, or the battery module is equipped with a flow meter that measures the flow rate of the cooling fan that cools the battery and periodically checks the flow rate measured by the flow meter. Based on this, it is determined whether the battery is swelled or the battery module is recovered and then directly disassembled and inspected. However, these conventional techniques may not remotely detect whether cell swelling of the battery module occurs, and since the battery module must be equipped with an additional device (e.g., a flow meter or pressure sensor), there are problems that the cost is increased and the efficiency of utilizing the internal space of the battery module is lowered. In addition, there are problems that the inspection method for recovering and disassembling the battery module is troublesome and takes a long time.

PRIOR ART DOCUMENT

Patent Literature

Japanese Patent Laid-Open Publication No. JP 2012-110129A

DISCLOSURE OF THE INVENTION

Technical Problem

Therefore, an object of the present invention is to provide a system and method for efficiently detecting swelling of a battery cell without mounting a separate additional device.

Technical Solution

According to an embodiment of the present invention, a battery cell swelling detection system includes: a battery module including one or more cells; a cooling fan for cooling the battery module; first and second temperature measurement units disposed in the battery module to measure a temperature of the battery module at regular intervals; a cooling fan control unit for determining whether the cooling fan operates according to the temperature of the battery module measured by the first and second temperature measurement units and controlling an operation of the cooling fan; and a swelling occurrence determination unit for determining whether a swelling of the battery module occurs using the temperature of the battery module measured in the first and second temperature measurement units.

The cooling fan control unit may include: a maximum temperature extraction unit for extracting a maximum temperature value among the first and second temperature values measured in the first and second temperature measurement units; a maximum temperature comparison unit for comparing the extracted maximum temperature value with a predetermined abnormal condition determination value; and a cooling fan operation determination unit for determining whether the cooling fan operates according to a comparison result of the maximum temperature comparison unit, and the cooling fan control unit may control an operation of the cooling fan according to the determination result on whether the cooling fan operates.

When it is determined that the cooling fan operation is required, the cooling fan control unit may generate a cooling fan operation On signal and transmit it to the cooling fan to control a cooling operation, and when it is determined that the cooling fan operation is not required, the cooling fan control unit may generate a cooling fan operation Off signal and transmit it to the cooling fan to control the cooling operation.

The swelling occurrence determination unit may include: a cooling fan driving detection unit for detecting whether the cooling fan is driven; a temperature deviation calculation unit for calculating a temperature deviation between the first and second temperature values measured in the first and second temperature measurement units; a first swelling comparison unit for comparing the calculated temperature deviation with a predetermined first swelling determination value; and a second swelling comparison unit for comparing the calculated temperature deviation with a predetermined second swelling determination value, wherein the temperature deviation calculation unit may operate a predetermined time after the cooling fan is detected to be driven by the cooling fan driving detection unit.

When the calculated temperature deviation is less than the predetermined first swelling determination value according to a comparison result of the first swelling comparison unit, it may be determined that a swelling first case occurs in the battery module, and when the calculated temperature deviation exceeds the predetermined second swelling determination value according to a comparison result of the second swelling comparison unit, it may be determined that a swelling second case occurs in the battery module.

According to an embodiment of the present invention, a swelling detection method of a battery cell includes: a temperature measurement step of measuring a temperature of the battery module at regular intervals; an abnormal condition determination step of determining a temperature abnormal condition of the battery module by using two or more temperature values of the battery module measured in the temperature measurement step; a cooling fan operation step of operating a cooling fan of the battery module according to a determination result of the abnormal condition determination step; and a swelling occurrence determination step of determining whether swelling of the battery module occurs based on the two or more temperature values measured in the temperature measurement step, wherein the swelling occurrence determination step is performed a predetermined time after the cooling fan operation step.

The abnormal condition determination step may include: a maximum temperature value extraction step of extracting a maximum temperature value among the two or more temperature values; and a maximum temperature comparison step of comparing the extracted maximum temperature value with a predetermined abnormal condition determination value, when the maximum temperature value exceeds the predetermined abnormal condition determination value, it may be determined that a temperature abnormal condition of the battery module occurs.

The swelling occurrence determining step may include: a temperature deviation calculation step of calculating a temperature deviation between the two or more temperature values; and a first swelling comparison step of comparing the calculated temperature deviation with a predetermined first swelling determination value, when the calculated temperature deviation is less than the predetermined first swelling determination value, it may be determined that a swelling first case occurs in the battery module The swelling occurrence determining step may further include: a second swelling comparison step of comparing the calculated temperature deviation with a predetermined second swelling determination value when the calculated temperature deviation is equal to or greater than the predetermined first swelling determination value according to a comparison result in the first swelling comparison step, when the calculated temperature deviation exceeds the predetermined second swelling determination value, it may be determined that a swelling second case occurs in the battery module.

Advantageous Effects

The present invention may easily sense/detect the occurrence of swelling of a battery cell or a pack without mounting a separate device, so that the production cost of the battery module may be reduced.

Also, its application range is not limited and the present invention may be applied to any system that performs battery pack cooling by the flow path such as air cooling and water cooling system, so that in addition to the pouch type lithium ion battery, it may be applied to batteries of various shapes and materials.

BRIEF DESCRIPTION OF THE DRAWINGS

FIG. 1 is a block diagram illustrating a battery cell swelling detection system configuration according to an embodiment of the present invention.

FIG. 2 is a view showing an example of a cooling passage narrowness phenomenon by cell swelling.

FIG. 3 is a view showing an example of a temperature deviation abnormal temperature condition in a module according to a cooling performance drop by a cooling passage narrowness phenomenon.

FIG. 4 is a flowchart of a battery cell swelling detection method according to an embodiment of the present invention.

MODE FOR CARRYING OUT THE INVENTION

Hereinafter, embodiments of the present invention will be described in detail with reference to the accompanying drawings so that those skilled in the art may easily carry out the present invention. The present invention may, however, be embodied in different forms and should not be construed as limited to the embodiments set forth herein. Parts not relating to description are omitted in the drawings in order to clearly describe the present invention and like reference numerals refer to like elements throughout.

Although the terms "initial," "second," etc., may be used herein to describe various elements, these elements should not be limited by these terms. The above terms are used only to distinguish one component from another. For example, an initial component may be referred to as a second component and vice versa without departing from the scope of the present invention. Terms used in this specification are used to describe specific embodiments, and are not intended to limit the scope of the present invention. The singular expressions include plural expressions unless the context clearly dictates otherwise.

Throughout the specification, when a portion is referred to as being "connected" to another portion, it includes not only "directly connected" but also "electrically connected" with another element therebetween. Furthermore, when it is described that one comprises (or includes or has) some elements, it should be understood that it may comprise (or include or has) only those elements, or it may comprise (or include or have) other elements as well as those elements if there is no specific limitation. The term "~ing operation" or "operation of ~ing" used throughout the specification does not mean "operation for ~ing".

Terms used in this specification may be currently widely used general terms in consideration of functions in the present invention but may vary according to the intents of those skilled in the art, precedents, or the advent of new technology. Additionally, in certain cases, there may be terms the applicant selects arbitrarily and in this case, their meanings are described in a corresponding description part of the present invention. Accordingly, terms used in the present invention should be defined based on the meaning of the term and the entire contents of the present invention instead of the simple term name.

Hereinafter, the present invention will be described in more detail with reference to the drawings.

1. Battery Cell Swelling Ring Detection System (See FIG. 1)

The battery cell swelling detection system according to an embodiment of the present invention may include the following configuration.

1.1. Battery Module 100

The battery module, for example, is a configuration mounted on an ESS device, various portable devices, and the like to supply power and may be configured to include a plurality of battery cells 110.

At this time, the corresponding module identification number is set in the battery module 100. Accordingly, when a plurality of battery modules 100 are connected in series and in parallel to form, for example, one battery rack, each battery module may be controlled by using the corresponding module identification number set for each battery module.

1.2. Cooling Fan 200

The cooling fan may be a configuration that is operated under the control of the cooling fan control unit 500 to prevent the battery module 100 from being continuously exposed to a high temperature condition.

For example, if the maximum temperature of the battery module exceeds a predetermined abnormal condition determination value, since the battery module is exposed to a high temperature condition, it is determined that the operation of the cooling fan is necessary to lower the temperature so that the cooling fan control unit 500 may turn on the cooling fan. Accordingly, the cooling fan may prevent the battery module from being continuously exposed to a high temperature condition by cooling the battery module.

That is, only when it is determined that the battery module enters a high temperature condition, the cooling fan is driven under the control of the cooling fan control unit 500.

The cooling fan may be provided at a position where it is easy to cool the battery module 100, and cool the battery module through a known battery module cooling method such as a method of introducing a coolant into the battery module (Blowing type) or discharging refrigerant to the outside of the battery module (Suction Type). For example, the cooling fan 200 may be disposed inside a case in which the battery module 100 is mounted.

1.3. First and Second Temperature Measurement Units 300 and 400

The first and second temperature measurement units 300 and 400 may be a configuration that is provided in the battery module 100 and measures the temperature of the battery module at regular intervals as shown in A of FIG. 2.

The first and second temperature measurement units are located at the inside of the battery module, specifically, asymmetric points on the cooling passage designed to allow the refrigerant flowing into the battery module to pass through it to measure the temperature of the battery module.

However, the present invention is not limited to a configuration in which only the first and second temperature measurement units, i.e., two temperature sensors, are included in the battery module, and they may be provided in two or more numbers and the temperature of the battery module may be measured. In this case, the temperature of the battery module may be measured by providing two or more temperature sensors A at asymmetric points on the designed cooling passage in the battery module. As described above, it may be positioned, for example, as shown in A of FIG. 2 to measure the temperature of the battery module.

At this time, although the first and second temperature measurement units will be described in detail later, since they are used to determine the temperature distribution abnormal condition in the battery module by using the deviation of each measured temperature value, in order to more accurately determine that the temperature distribution condition, it may be preferable that they are spaced apart from each other at certain intervals rather than close to each other.

1.4. Cooling Fan Control Unit 500

The cooling fan control unit may be a configuration that controls the operation of the cooling fan 200 according to the temperature of the battery module measured in the first and second temperature measurement units 300 and 400, and the detailed configuration thereof may be configured as follows.

A. Maximum Temperature Extraction Unit 510

First, the maximum temperature extraction unit is a configuration that compares first and second temperature values measured in the first and second temperature measurement units 300 and 400, respectively, and extracts a larger temperature value among them. That is, the maximum temperature value among the first and second temperature measurement values is extracted.

The reason for extracting the maximum temperature value among the first and second temperature values in the maximum temperature extraction unit is to determine the temperature abnormal condition of the battery module through a comparison between a maximum temperature value among the temperature values measured in the battery module and a predetermined abnormality determination value which is a value for determining a temperature abnormal condition of the battery module described later.

B. Maximum Temperature Comparison Unit 520

When the maximum temperature value of the battery module is extracted through the maximum temperature extraction unit 510 as described above, the extracted maximum temperature value of the battery module may be compared with a predetermined abnormal condition determination value. Here, since the temperature abnormal condition of the battery module means the high temperature condition of the battery module, the predetermined abnormal condition determination value may mean a temperature value set to determine whether the battery module is in a high temperature condition. According to the comparison result through the comparison, the cooling fan operation determination unit 530, which will be described later, may determine whether the cooling operation is performed.

C. Cooling Fan Operation Determination Unit 530

The cooling fan operation determination unit may determine whether the cooling fan of the battery module operates according to a comparison result of the maximum temperature comparison unit 520.

As described above, the cooling fan 200 is a configuration that cools the battery module 100 such that the battery module 100 is not continuously exposed to a high temperature condition. Therefore, the cooling fan operation determination unit may determine whether the cooling fan operates by determining whether the temperature of the battery module is abnormal according to the comparison result between the maximum temperature value of the battery module and the predetermined abnormal condition determination value. For example, if the maximum temperature value of the battery module exceeds a predetermined abnormal condition determination value according to the comparison result, it is determined that the corresponding battery module enters the high temperature condition so that it is determined that the battery module should be cooled. This determines that the cooling fan should be operated.

For example, if the maximum temperature value of the battery module is less than a predetermined abnormal condition determination value, the corresponding battery module means a proper temperature condition that is not the high temperature condition, it is determined that cooling the battery module is not necessary, so that it is determined not to operate the cooling fan.

Thus, the cooling fan control unit may control the operation of the cooling fan by generating a signal to control the operation of the cooling fan according to the determination result of the cooling fan operation determination unit described above.

Specifically, when it is determined that the cooling fan should be operated, a cooling fan operation On signal is generated and transmitted to the cooling fan 200 to control the operation of the cooling fan. Accordingly, the cooling fan 200 receiving the cooling fan operation On signal may operate to cool the battery module.

On the other hand, if it is determined that the operation of the cooling fan is not necessary, the cooling fan operation Off signal may be generated and transmitted to the cooling fan 200 to control the operation of the cooling fan. Accordingly, the cooling fan 200 receiving the cooling fan operation Off signal does not perform the operation of cooling the battery module.

As described above, since the first and second temperature measurement units 300 and 400 measure the temperature of the battery module at regular intervals, accordingly, the cooling fan control unit 500 also determines whether the battery module is in a high temperature condition as described above at regular intervals and controls the operation of the cooling fan 200 to control the battery module to be not continuously exposed to a high temperature condition.

1.5. Swelling Occurrence Determination Unit 600

The swelling occurrence determination unit is a configuration that determines whether the swelling of the battery module occurs using the temperature value of the battery module measured in the first and second temperature measurement units 300 and 400. The concrete detailed configuration may be configured as follows.

A. Cooling Fan Driving Detection Unit 610

The cooling fan driving detection unit is a configuration that detects whether there is a cooling operation of the cooling fan 200. It is connected to the cooling fan control unit 500 and may detect whether the cooling fan 200 is driven according to a cooling fan operation On/Off signal outputted from the cooling fan control unit 500.

When the cooling fan operation On signal is outputted from the cooling fan control unit 500, it may be confirmed that the cooling fan is driven by detecting this. If it is confirmed, a cooling fan driving signal indicating the driving of the cooling fan may be generated and outputted to the temperature deviation calculation unit 620 described later.

The reason for this is that, since the present invention detects the narrowness of a cooling passage due to swelling of a cell in a battery module as a temperature distribution abnormality of a battery module and uses the principle of determining the swelling of the battery module, in an environment in which the cooling fan 200 is driven according to the temperature condition (high temperature condition) of the battery module, it is possible to determine/detect the swelling of the battery module, so that the temperature deviation calculation unit 620 for performing this, which will be described later, is configured to operate when a cooling fan driving signal is inputted.

B. Temperature Deviation Calculation Unit 620

The temperature deviation calculation unit 620 is a configuration that calculates the difference between the first and second temperature values measured in the first and second temperature measurement units 300 and 400, and may operate when the cooling fan driving signal is inputted from the cooling fan driving detection unit 610 as described above. At this time, after receiving the cooling fan driving signal, it may operate after a predetermined time.

The reason for this is that after the cooling operation, since the principle of determining the cell swelling occurrence by the temperature distribution abnormal condition according to the cooling flow rate change in the battery module is used, after the cooling operation of the battery module is completed to some extent, it may be made more accurate to determine whether there is swelling according to the temperature distribution condition inside the battery module. Therefore, by calculating the temperature deviation when a predetermined time elapses after receiving the cooling fan driving signal, it may be preferable to be used for swelling determination.

Meanwhile, in the configuration of the first and second temperature measurement units 300 and 400 as described, for example, if the battery module includes more than two temperature sensors (first and second temperature measurement units), the temperature deviation may be calculated as follows.

For example, when four temperature sensors are configured in the battery module, they are referred to as first to fourth temperature measurement units, respectively. If the temperature values measured in the first to fourth temperature measurement units are the first to fourth temperature values, the temperature deviation calculation unit 620 sets the first and third temperature measurement units into one group (hereinafter referred to as a first temperature group) and the second and fourth temperature measurement units into one group (hereinafter referred to as a second temperature group) when calculating a temperature deviation from them, and calculates the average of the first and third temperature values, so that the average of the second and fourth temperature values may be calculated as the representative temperature of the first temperature group and may be calculated as the representative temperature of the second temperature group. Accordingly, the temperature deviation calculation unit may calculate the temperature deviation by calculating the difference between the representative temperature of the first temperature group and the representative temperature of the second temperature group calculated as described above.

Even in the case where it is composed of more than four temperature sensors besides this case, as described above, it is classified into two temperature groups and the average of the temperature values included in each temperature group is calculated as the representative temperature of the corresponding temperature group, so that the temperature deviation between the two temperature groups may be calculated.

C. First Swelling Comparison Unit 630

The first swelling comparison unit is a configuration that compares the temperature deviation calculated in the temperature deviation calculation unit 620 with a predetermined first swelling determination value, which is a value for determining whether swelling occurs in the battery module.

Here, the predetermined first swelling determination value is a value set to determine whether a swelling first case of the battery module occurs or not, and means a lower limit value of a normal determination allowable range of the battery module, and this may be experimentally extracted and set according to design elements of a module pack size, a structure, a cell layout type, and a cooling passage (refrigerant passage).

The swelling occurrence determination unit 600 may determine whether a swelling first case of the battery module occurs according to the comparison result of the first swelling comparison unit.

According to a comparison result, if the calculated temperature deviation is less than the predetermined first swelling determination value, it may be determined that the swelling first case occurs in the corresponding battery module. The swelling first case may mean that the battery module may not be cooled in a severe swelling state.

At this time, as described above, the temperature deviation calculation unit 620 operates when the cooling fan is detected as being driven by the cooling fan driving detection unit 610, and the driving of the cooling fan is a case where the maximum temperature value among the first and second temperature values exceeds the abnormal condition determination value, which is a value for determining whether the battery module is in a high temperature condition. Therefore, the fact that the temperature difference which is the difference between the first and second temperature values is less than the first swelling determination value which is the lower limit value of the normal determination allowable range of the battery module means that both the first and second temperature values exceed the abnormal condition determination value and means that the high temperature condition of the battery module is not solved even though the cooling fan is activated, that is, the cooling operation in the battery module is not normally performed. In this case, the swelling first case may indicate a severe swelling state in which the battery module may not be cooled.

D. Second Swelling Comparison Unit 640

The second swelling comparison unit is a configuration that compares the temperature deviation calculated in the temperature deviation calculation unit 620 with a predetermined second swelling determination value, which is a value for determining whether swelling occurs in the battery module.

Here, the predetermined second swelling determination value is a value set to determine whether a swelling second case of the battery module occurs or not, and means an upper limit value of a normal determination allowable range of the battery module, and as described above, this may be experimentally extracted and set according to design elements of a module pack size, a structure, a cell layout type, and a cooling passage (refrigerant passage).

The swelling occurrence determination unit 600 may determine whether a swelling second case of the battery module occurs according to the comparison result of the second swelling comparison unit.

According to a comparison result, if the calculated temperature deviation exceeds the predetermined second swelling determination value, it may be determined that the swelling second case occurs in the corresponding battery module. The swelling second case may mean that a part of the cooling passage of the corresponding battery module is shielded in a serious swelling state which is better than the swelling first case.

At this time, as described above, the temperature deviation calculation unit 620 operates when the cooling fan is detected as being driven by the cooling fan driving detection unit 610, and the driving of the cooling fan is a case where the maximum temperature value among the first and second temperature values exceeds the abnormal condition determination value, which is a value for determining whether the battery module is in a high temperature condition. Therefore, since the fact that the temperature difference which is the difference between the first and second temperature values exceeds the second swelling determination value which is the upper limit value of the normal determination allowable range of the battery module means that one temperature value among the first and second temperature values exceed the abnormal condition determination value and the other temperature value is included the normal determination allowable range of the battery module, this may mean that cooling is performed until the cell swelling point occurred in the battery module, but cooling is not performed after the cell swelling point due to cooling passage narrowness, so that the high temperature condition of the part of the battery module is not solved. Therefore, in this case, the swelling second case may be determined as a state of serious swelling and that some cooling passage of the corresponding battery module is shielded.

As a basis for determining this, referring to FIG. 2, when a swelling phenomenon occurs in a cell in the battery module, as the narrowness of the cooling passage through which the refrigerant introduced by the cooling fan occurs by an expanded cell, the space becomes scarce. And, the part after the point where the cooling passage narrowness occurs may not be cooled, so that a change in the cooling flow rate in the battery module occurs. Accordingly, referring to FIG. 3, the cooling uniformity in the battery module is degraded and the swelling first case or the swelling second case, which is a specific deviation state out of the normal determination allowable range of the battery module, i.e., the first swelling determination value to the second swelling determination value, occurs, so that it is based on the principle that the change of cooling flow rate due to the cooling passage narrowness phenomenon caused by cell swelling is detected as a temperature distribution abnormal condition. Therefore, when driving the cooling fan, by using the temperature deviation which is the difference of the measured temperature values in the first and second temperature measurement units 300 and 400 located at the asymmetric points in the battery module, it is possible to determine whether swelling of the battery module occurs as described above. In order to explain a temperature-specific deviation phenomenon shown when swelling occurs, FIG. 3 shows an example in which a temperature-specific deviation phenomenon occurs in specific battery modules 100*c* and 100*e* among the plurality of battery modules 100*a* to 100*e*.

1.6. Memory Unit 700

The memory unit is a configuration that stores the reference data for determining whether a temperature abnormal condition and a swelling of a battery module occur. The reference data may be configured including an abnormal condition determination value for determining whether a temperature abnormality condition of the battery module, that is, a high temperature condition, is entered in the cooling fan control unit 500, a first swelling determination value for determining whether a swelling first case of the battery module occurs in the swelling occurrence determination unit 600, and a second swelling determination value for determining whether a swelling second case occurs.

1.7. Notification Unit 800

If it is determined that swelling occurs in the cell included in the battery module in the swelling occurrence determination unit 600, the present invention may further include a notification unit for notifying this to an administrator or a user.

The notification unit relates and displays information of the identification number of the corresponding battery module, the swelling degree of the swelling first case or the second swelling case according to a determination result of the swing occurrence determination unit to allow the administrator or the user to recognize it. For reference, the cooling fan control unit 500, the swelling occurrence determination unit 600, the memory unit 700, and the notification unit 800 may be included in the battery management system (BMS).

Also, the configurations 100 to 800 described above may be configurations included in one module pack case.

Although only one battery module 100 is shown in FIG. 1 for the convenience, it may be composed of a plurality of battery modules. As described above, each battery module has a corresponding module identification number and the cooling fan control unit 500 and the swelling occurrence determination unit 600 may control a cooling operation of a corresponding battery module and determine whether swelling occurs using each module identification number.

2. Battery Cell Swelling Detection Method According to Embodiment of Present Invention FIG. 4 is a flowchart of a battery cell swelling detection method according to an embodiment of the present invention. Referring to this, the battery cell swelling detection method according to an embodiment of the present invention will be described.

A method of detecting a battery cell swelling according to an embodiment of the present invention is a method of determining/detecting the occurrence of cell swelling of battery module by calculating a deviation of a temperature value measured using at least two temperature sensors installed in the battery module, based on this, determining the temperature distribution abnormal condition in the battery module, and understanding the phenomenon of cooling passage narrowness of the battery module.

The battery cell swelling detection method of the present invention may be performed according to the following procedure.

2.1. Temperature Measurement Step S100

The temperature measurement step is a step of measuring the temperature of the battery module at regular intervals. This may be performed using two or more temperature sensors A provided in the battery module 100 as described in the system configuration (see FIG. 2). Although the case where more than two temperature sensors are configured in the above system configuration is described, in the following description, it is assumed that two temperature sensors are provided in the battery module, and they are referred to as first and second temperature measurement units 300 and 400 and described. Temperature values measured in the first and second temperature measurement units will be referred to as first and second temperature values, respectively. Specifically, the temperature measurement step S100 is performed by the first and second temperature measurement units 300 and 400 respectively provided at asymmetric positions on the designed cooling passage in the battery module, 2. Thus, the first and second temperature value may be calculated.

2.2. Abnormal Condition Determination Step S200

The abnormal condition determination step is a step of determining whether there is a temperature abnormal condition of a battery module by using the first and second temperature values measured in the temperature measurement step. Here, the temperature abnormal condition means that the battery module is in a high temperature condition, and the detailed procedure for determining this may be as follows.

A. Maximum Temperature Value Extraction Step S210

The maximum temperature calculation step is a step of extracting a larger temperature value, i.e., a maximum temperature value, among the first and second temperature values measured in the temperature measurement step S100. This is because if the maximum temperature value in the battery module is compared with a predetermined abnormal condition determination value, it may be determined whether the temperature condition of the battery module is an abnormal condition, that is, a high temperature condition.

B. Maximum Temperature Comparison Step S220

The maximum temperature comparison step is a step of comparing the maximum temperature value of the battery module calculated through the maximum temperature calculation step S220 with a predetermined abnormal condition determination value.

The predetermined abnormal condition determination value is a temperature value set to determine whether the battery module is in a high temperature condition.

Through the comparison, the temperature abnormal condition of the battery module, that is, the high temperature condition, may be determined according to the comparison result. If the maximum temperature value of the battery module exceeds a predetermined abnormal condition determination value, it is determined that the corresponding battery module enters the high temperature condition. On the other hand, if the maximum temperature value of the battery module is less than a predetermined abnormal condition determination value, it is determined that the corresponding battery module is a proper temperature condition. This may be performed by the cooling fan control unit 500 described in the system configuration.

2.3. Cooling Fan Operation Step S300

The cooling fan operation step is a step of operating the cooling fan 200 according to the determination result of the abnormal condition determination step S200.

According to a result of the abnormal condition determination step S200, if it is determined that the battery module enters a high temperature condition, the cooling fan 200 may be operated to prevent the battery module from being continuously exposed to a high temperature condition. Accordingly, the cooling fan 200 may perform a cooling operation of the corresponding battery module to cool the battery module, thereby lowering the temperature of the battery module so as to escape the high temperature condition. This may be performed by the cooling fan control unit 500 described in the system configuration.

On the other hand, according to a result of the abnormal condition determination step S200, if it is determined that the battery module is not in the high temperature condition, the cooling fan operation step S300 is not performed and returns to the temperature measurement step S100, so that the temperature condition of the battery module may be measured again. 2.4. Swelling Occurrence Determination Step S400

The abnormal condition determination step is a step of determining whether there is a swelling occurrence of a battery module by using the first and second temperature values measured in the temperature measurement step S100, and the detailed procedure may be configured as follows. At this time, as described in the system configuration, the swelling occurrence determination step may be preferably performed after a predetermined time after the cooling fan operation step S300. It may be operated after a predetermined time after a cooling fan driving signal indicating that the cooling fan operation step S300 is performed is received from the cooling fan driving detection unit 610 described above.

A. Temperature Deviation Calculation Step S410

It is a step of calculating a difference between the first and second temperature values. This is to detect the narrowness phenomenon of the cooling passage according to the swelling occurrence in the battery module as the temperature distribution abnormality according to the cooling flow rate of the battery module, and to determine the swelling occurrence of the battery module through the following step. (See FIGS. 2 and 3)

B. First Swelling Determination Step S420

The first swelling determination step is a step of comparing the temperature deviation of the battery module calculated in the temperature deviation calculation step S410 with a predetermined first swelling determination value, and determining whether a swelling first case of the battery module occurs according to the comparison result.

Here, the predetermined first swelling determination value may be a value set to determine whether a swelling first case of the battery module occurs, and may mean a lower limit value of a normal determination allowable range of the battery module. This may be experimentally extracted and set according to the module pack size, structure, cell layout type, and design factors of the cooling passage (refrigerant passage).

If the temperature deviation of the battery module is less than a predetermined first swelling determination value, the corresponding battery module may determine that a swelling first case occurs. The swelling first case may mean that the cooling of the corresponding battery module is no longer possible in a severe swelling state.

In such a way, if the battery module is determined as a swelling first case, the determination result may be notified to the administrator or the user together with the identification number of the corresponding battery module.

Therefore, the administrator/user who recognizes this may take countermeasures to prevent system damage and maintain performance, and if the swelling first case of the corresponding battery module is not detected and continued, it is possible to prevent various dangerous accidents that may occur.

C. Second Swelling Determination Step S430

If the temperature deviation of the battery module is equal to or greater than the first swelling determination value in the first swinging determination step S420, the corresponding battery module determines that a swelling first case does not occur, and a second swelling determination step may be performed.

The second swelling determination step is a step of determining whether a swelling second case of the battery module occurs by comparing a temperature deviation of the battery module with a predetermined second swelling determination value. Here, the predetermined second swelling determination value is a value set to determine whether a swelling second case of the battery module occurs or not, and means an upper limit value of a normal determination allowable range of the battery module, and as described above, this may be experimentally extracted and set according to design elements of a module pack size, a structure, a cell layout type, and a cooling passage (refrigerant passage).

If the temperature deviation of the battery module is compared with a predetermined second swelling determination value and the temperature deviation of the battery module exceeds a predetermined second swelling determination value according to a comparison result, it may be determined that the swelling second case occurs in the corresponding battery module. The swelling second case may mean that a part of the cooling passage of the corresponding battery module is shielded in a serious swelling state which is better than the swelling first case.

Accordingly, if the battery module determines that a swelling first case occurs, the determination result may be notified to the administrator or the user together with the identification number of the corresponding battery module. Therefore, the administrator/user who recognizes this may take countermeasures to prevent system damage and maintain performance, and if the swelling second case of the corresponding battery module is not detected and continued, it is possible to prevent various dangerous accidents that may occur.

On the other hand, if the temperature deviation of the battery module is less than a predetermined second swelling determination value, the corresponding battery module determines that the swelling second case does not occur and returns to the temperature measurement step S100 to detect the temperature condition of the battery module again.

The swelling determination step S400 may be performed in an environment in which the cooling fan is operated through the cooling fan operation step S300, and a more detailed description of this may be understood with reference to the system configuration swelling occurrence determination unit 600. In such a way, in relation to a basis for determining whether swelling of the battery module occurs through S100 to S400, when the cell swelling in the battery module occurs, the cooling passage, which is the coolant passage in the battery module, is narrowed, resulting in a change in the cooling flow rate in the battery module. Accordingly, when the cooling fan operates, as a space (cooling passage) through which the refrigerant flowing from the cooling fan into the battery module passes becomes insufficient, cooling of the part after the point where cooling passage narrowness phenomenon occurs due to cell swelling is prevented. Accordingly, the cooling uniformity in the battery module is degraded and the swelling first case or the swelling second case, which is a specific deviation state out of the normal determination allowable range of the battery module, i.e., the first swelling determination value to the second swelling determination value, occurs, so that it is based on the principle that the change of cooling flow rate due to the cooling passage narrowness phenomenon caused by cell swelling is detected as a temperature distribution abnormal condition. (See FIGS. 2 and 3)

Therefore, when the cooling fan is driven, by using the deviation of the temperature values measured through the temperature sensors located at the asymmetric points in the battery module, it is possible to determine whether the swelling of the battery module occurs.

Accordingly, in order to sense/detect the swelling of the battery module, by using a built-in temperature sensor in the battery module without additional devices (e.g., flow meters), by determining the swelling occurrence of the battery module, the battery module where the swelling occurs is detected, and action for this is provided. Therefore, it is possible to prevent damage to the battery system and to maintain its performance, and it is possible to prevent various safety accidents caused by not detecting the battery module where swelling occurs.

On the other hand, although the technical idea of the present invention is specifically described with reference to the above embodiments, it should be noted that the above embodiments are for the purpose of explanation and not for the purpose of limitation. It will be apparent to those skilled in the art that various modifications and variations may be made in the present invention without departing from the spirit and scope of the invention.

The invention claimed is:

1. A battery cell swelling detection system comprising:
   a battery module including one or more cells;
   a cooling fan for cooling the battery module;
   first and second temperature measurement units disposed in the battery module to measure a temperature of the battery module at regular intervals;
   a cooling fan control unit for determining whether the cooling fan operates according to the temperature of the battery module measured by the first and second temperature measurement units and controlling an operation of the cooling fan; and a swelling occurrence determination unit for determining whether a swelling of the battery module occurs using the temperature of the battery module measured in the first and second temperature measurement units, wherein a change in a width of the cooling passage is determined based on the temperature of the battery module measured in the first and second temperature measurement units, and wherein the cooling fan is controlled based on change of the width of the cooling passage due to swelling.

2. The system of claim 1, wherein the cooling fan control unit comprises:

a maximum temperature extraction unit for extracting a maximum temperature value among the first and second temperature values measured in the first and second temperature measurement units;

a maximum temperature comparison unit for comparing the extracted maximum temperature value with a predetermined abnormal condition determination value; and a cooling fan operation determination unit for determining whether the cooling fan operates according to a comparison result of the maximum temperature comparison unit, and wherein the cooling fan control unit controls an operation of the cooling fan according to the determination result on whether the cooling fan operates.

3. The system of claim 2, wherein when it is determined that the cooling fan operation is required, the cooling fan control unit generates a cooling fan operation On signal and transmits it to the cooling fan to control a cooling operation, and wherein when it is determined that the cooling fan operation is not required, the cooling fan control unit generates a cooling fan operation Off signal and transmits it to the cooling fan to control the cooling operation.

4. The system of claim 3, wherein the swelling occurrence determination unit comprises:

a cooling fan driving detection unit for detecting whether the cooling fan is driven;

a temperature deviation calculation unit for calculating a temperature deviation between the first and second temperature values measured in the first and second temperature measurement units;

a first swelling comparison unit for comparing the calculated temperature deviation with a predetermined first swelling determination value; and a second swelling comparison unit for comparing the calculated temperature deviation with a predetermined second swelling determination value, wherein the temperature deviation calculation unit operates a predetermined time after the cooling fan is detected to be driven by the cooling fan driving detection unit.

5. The system of claim 4, wherein when the calculated temperature deviation is less than the predetermined first swelling determination value according to a comparison result of the first swelling comparison unit, it is determined that a swelling first case occurs in the battery module, and when the calculated temperature deviation exceeds the predetermined second swelling determination value according to a comparison result of the second swelling comparison unit, it is determined that a swelling second case occurs in the battery module.

6. The system of claim 1, further comprising a cooling passage passing through the battery module and the one or more cells and configured to receive a refrigerant, wherein the first and second temperature measurement units are at asymmetric points on the cooling passage.

* * * * *